United States Patent
Iguchi et al.

(10) Patent No.: US 10,727,528 B2
(45) Date of Patent: Jul. 28, 2020

(54) METHOD OF PRODUCING LITHIUM ION SECONDARY BATTERY

(71) Applicant: TOYOTA JIDOSHA KABUSHIKI KAISHA, Toyota-shi, Aichi-ken (JP)

(72) Inventors: Hiroki Iguchi, Nagoya (JP); Hideaki Fujita, Kyotanabe (JP); Hideki Sano, Ikeda (JP); Kaoru Inoue, Hirakata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 281 days.

(21) Appl. No.: 15/962,562

(22) Filed: Apr. 25, 2018

(65) Prior Publication Data

US 2018/0316040 A1 Nov. 1, 2018

(30) Foreign Application Priority Data

May 1, 2017 (JP) ................................ 2017-091372

(51) Int. Cl.
*H01M 10/04* (2006.01)
*H01M 10/0567* (2010.01)
(Continued)

(52) U.S. Cl.
CPC ....... *H01M 10/045* (2013.01); *H01M 4/0447* (2013.01); *H01M 4/364* (2013.01); *H01M 4/483* (2013.01); *H01M 4/587* (2013.01); *H01M 10/049* (2013.01); *H01M 10/0525* (2013.01); *H01M 10/0567* (2013.01); *H01M 10/0569* (2013.01); *H02J 7/007* (2013.01)

(58) Field of Classification Search
CPC ............. H01M 10/045; H01M 10/049; H01M 10/0525; H01M 10/0567; H01M 10/0569; H01M 4/0447; H01M 4/364; H01M 4/483; H01M 4/587
See application file for complete search history.

(56) References Cited

U.S. PATENT DOCUMENTS

2013/0266875 A1 10/2013 Matsumoto et al.
2016/0293944 A1 10/2016 Yoon et al.
2016/0329613 A1* 11/2016 Kusachi ................ H01M 4/623

FOREIGN PATENT DOCUMENTS

| JP | 2013110017 A | * | 6/2013 |
| JP | 2016-532253 A | | 10/2016 |
| WO | 2012/056765 A1 | | 5/2012 |

* cited by examiner

*Primary Examiner* — Basia A Ridley
*Assistant Examiner* — Heng M. Chan
(74) *Attorney, Agent, or Firm* — Oliff PLC

(57) ABSTRACT

A method of producing a lithium ion secondary battery includes preparing a case in which an electrode group including at least a positive electrode and a negative electrode is accommodated; impregnating a first electrolyte solution into the electrode group, lowering a potential of the negative electrode to a first potential, injecting FEC into a case, and lowering a potential of the negative electrode to a second potential. The negative electrode contains at least graphite and silicon oxide. The first electrolyte solution does not contain FEC. An additive has a reductive decomposition potential of 0.5 V (vs. Li$^+$/Li) or more and 1.5 V (vs. Li$^+$/Li) or less. The first potential is higher than 0.2 V (vs. Li$^+$/Li) and is equal to or lower than the reductive decomposition potential. The second potential is 0.2 V (vs. Li$^+$/Li) or less.

5 Claims, 5 Drawing Sheets

(51) Int. Cl.
*H01M 10/0525* (2010.01)
*H01M 10/0569* (2010.01)
*H01M 4/36* (2006.01)
*H01M 4/38* (2006.01)
*H01M 4/587* (2010.01)
*H01M 4/04* (2006.01)
*H01M 4/48* (2010.01)
*H01M 4/133* (2010.01)
*H02J 7/00* (2006.01)

METHOD OF PRODUCING LITHIUM ION SECONDARY BATTERY

INCORPORATION BY REFERENCE

The disclosure of Japanese Patent Application No. 2017-091372 filed on May 1, 2017 including the specification, drawings and abstract is incorporated herein by reference in its entirety.

BACKGROUND

1. Technical Field

The present disclosure relates to a method of producing a lithium ion secondary battery.

2. Description of Related Art

Japanese Unexamined Patent Application Publication (Translation of PCT Application) No. 2016-532253 (JP 2016-532253 A) discloses a lithium ion secondary battery containing graphite and silicon oxide as a negative electrode active material wherein vinylene carbonate (VC) and fluoroethylene carbonate (FEC) are added to an electrolyte solution.

SUMMARY

A lithium ion secondary battery (hereinafter abbreviated as a "battery" in some cases) with a high capacity is required. Graphite is used as a negative electrode active material. Silicon oxide has a higher specific capacity (capacity per unit mass) than graphite. When a mixture of graphite and silicon oxide is used, it can be expected that a battery capacity will be increased. However, silicon oxide tends to cause side reactions with respect to an electrolyte solution. That is, there is room for improvement in durability (high temperature storage characteristics) of silicon oxide.

In order to improve the durability of silicon oxide, it is conceivable to add FEC to an electrolyte solution. Thus, during initial charging, FEC is reduced and decomposed on the surface of silicon oxide, and a coating derived from FEC may be formed on the surface of silicon oxide. This coating is also called a solid electrolyte interface (SEI). When the SEI is formed, side reactions between silicon oxide and the electrolyte solution can be prevented. That is, improvement in durability can be expected.

However, in a negative electrode containing a mixture of graphite and silicon oxide, an SEI derived from FEC may also be formed on the surface of graphite. Therefore, the obtained durability improvement effect with respect to an amount of FEC added is thought to be weak.

According to the present disclosure, in a lithium ion secondary battery containing graphite and silicon oxide in a negative electrode, a stronger durability improvement effect obtained with respect to an amount of FEC added is provided.

The technical configuration and operations and effects of the present disclosure will be described below. However, the mechanism of action of the present disclosure includes assumptions. The scope of the claims should not be regarded as being limited according to the accuracy of the mechanism of action.

[1] A method of producing a lithium ion secondary battery includes the following (A) to (E): (A) preparing a case in which an electrode group including at least a positive electrode and a negative electrode is accommodated; (B) injecting a first electrolyte solution containing an additive into the case so that the first electrolyte solution is impregnated into the electrode group; (C) charging the electrode group into which the first electrolyte solution is impregnated so that a potential of the negative electrode is lowered to a first potential; (D) preparing a second electrolyte solution containing fluoroethylene carbonate in the case by injecting fluoroethylene carbonate into the case after the potential of the negative electrode is lowered to the first potential; and (E) charging the electrode group after the second electrolyte solution is prepared so that the potential of the negative electrode is lowered to a second potential. The negative electrode contains at least graphite and silicon oxide. The first electrolyte solution does not contain fluoroethylene carbonate. The additive has a reductive decomposition potential of 0.5 V (vs. Li$^+$/Li) or more and 1.5 V (vs. Li$^+$/Li) or less. The first potential is higher than 0.2 V (vs. Li$^+$/Li) and is equal to or lower than the reductive decomposition potential. The second potential is 0.2 V (vs. Li$^+$/Li) or less.

In the production method of the present disclosure, the injection of the electrolyte solution and charging are performed stepwise. First, the first electrolyte solution containing a predetermined additive without FEC is injected. Next, charging is performed until the potential of the negative electrode reaches the first potential. The first potential is equal to or lower than the reductive decomposition potential of the additive.

Since silicon oxide is an oxide, it is thought to have lower electron conductivity than graphite. Thus, in the initial stage of charging, a charging reaction (insertion reaction of lithium (Li) ions) of graphite mainly occurs, and a charging reaction of silicon oxide is unlikely to occur. According to new findings of the present disclosure, when the potential of the negative electrode is 0.2 V (vs. Li$^+$/Li) or less, the occurrence of a charging reaction of silicon oxide starts.

In the production method of the present disclosure, the first potential is higher than 0.2 V (vs. Li$^+$/Li). Thus, during charging to the first potential, mainly a charging reaction of graphite is thought to occur. On the other hand, it is thought that a charging reaction of silicon oxide is unlikely to occur and the potential of silicon oxide remains high. That is, reductive decomposition (forming an SEI derived from the additive) of the additive is thought to occur mainly on the surface of graphite.

After an SEI derived from the additive is formed on the surface of graphite, FEC is injected. After FEC is injected, charging is performed until the potential of the negative electrode reaches a second potential. The second potential is 0.2 V (vs. Li$^+$/Li) or less. Thus, a charging reaction of silicon oxide is thought to occur. In this case, a predetermined amount of Li ions has already been inserted into graphite, and an SEI derived from the additive has already been formed on the surface of graphite. Therefore, on the surface of graphite, reductive decomposition of FEC (forming an SEI derived from FEC) is thought to be unlikely to occur. It is thought that FEC is reduced and decomposed mainly on the surface of silicon oxide and an SEI derived from FEC is formed on the surface of silicon oxide. In addition, the additive added previously is reduced due to reductive decomposition on the surface of graphite. Therefore, an SEI derived from the additive is thought to be unlikely to be formed on the surface of silicon oxide.

Accordingly, in the production method of the present disclosure, it is thought that graphite contains an SEI derived mainly from the additive and silicon oxide contains an SEI derived mainly from FEC. Thus, side reactions between silicon oxide and the electrolyte solution are expected to be efficiently prevented. Therefore, a stronger durability improvement effect obtained with respect to an amount of FEC added is expected.

Here, in this specification, the unit of the potential "V (vs. Li$^+$/Li)" indicates a potential based on the standard oxidation-reduction potential of lithium.

[2] The additive is at least one selected from the group consisting of vinylene carbonate, propane sultone and ethylene sulfite. All of vinylene carbonate (VC), propane sultone (PS), and ethylene sulfite (ES) may have a reductive decomposition potential of 0.5 V (vs. Li$^+$/Li) or more and 1.5 V (vs. Li$^+$/Li) or less.

[3] The first potential may be 0.5 V (vs. Li$^+$/Li) or more. Therefore, during charging to the first potential, it becomes more difficult for silicon oxide to be charged. That is, it is possible to prevent an SEI derived from the additive (other than FEC) from being formed on the surface of silicon oxide. As a result, more SEI derived from FEC is expected to be formed on the surface of silicon oxide.

[4] The fluoroethylene carbonate may have a proportion of 1 mass % or more and 7 mass % or less with respect to the second electrolyte solution. When a content of FEC in the second electrolyte solution is 1 mass % or more, improvement in capacity retention rate during high temperature storage can be expected. When a content of FEC in the second electrolyte solution is 7 mass % or less, an amount of gas generated during high temperature storage is expected to be reduced.

[5] The silicon oxide may have a proportion of 3 mass % or more and 7 mass % or less with respect to a total amount of the graphite and the silicon oxide. Thus, for example, a balance between a capacity and durability is expected to be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
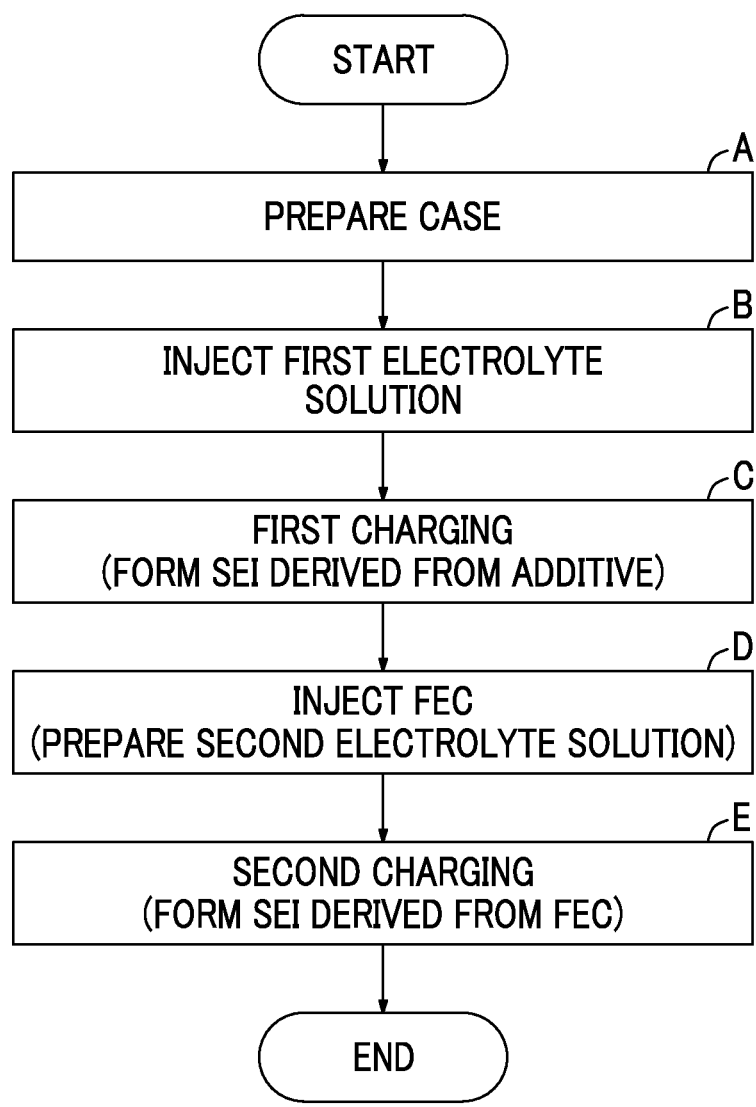
FIG. 1 is a flowchart showing an overview a method of producing a lithium ion secondary battery according to the present embodiment.

Embodiments (referred to as "the present embodiment" in this specification) of the present disclosure will be described below. However, the following description does not limit to the scope of the appended claims.

In the drawings of the present disclosure, for convenience of explanation, sizes are appropriately changed. The sizes in the drawings of the present disclosure do not reflect actual sizes.

Method of Producing a Lithium Ion Secondary Battery

FIG. 1 is a flowchart showing an overview of a method of producing a lithium ion secondary battery of the present embodiment. The production method of the present embodiment includes "(A) preparing a case," "(B) injecting a first electrolyte solution," "(C) first charging," "(D) injecting FEC," and "(E) second charging." The production method of the present embodiment will be described below in that order.

(A) Preparing a Case

The production method of the present embodiment includes preparing a case in which an electrode group including at least a positive electrode and a negative electrode is accommodated.

Negative Electrode

Figure 2:
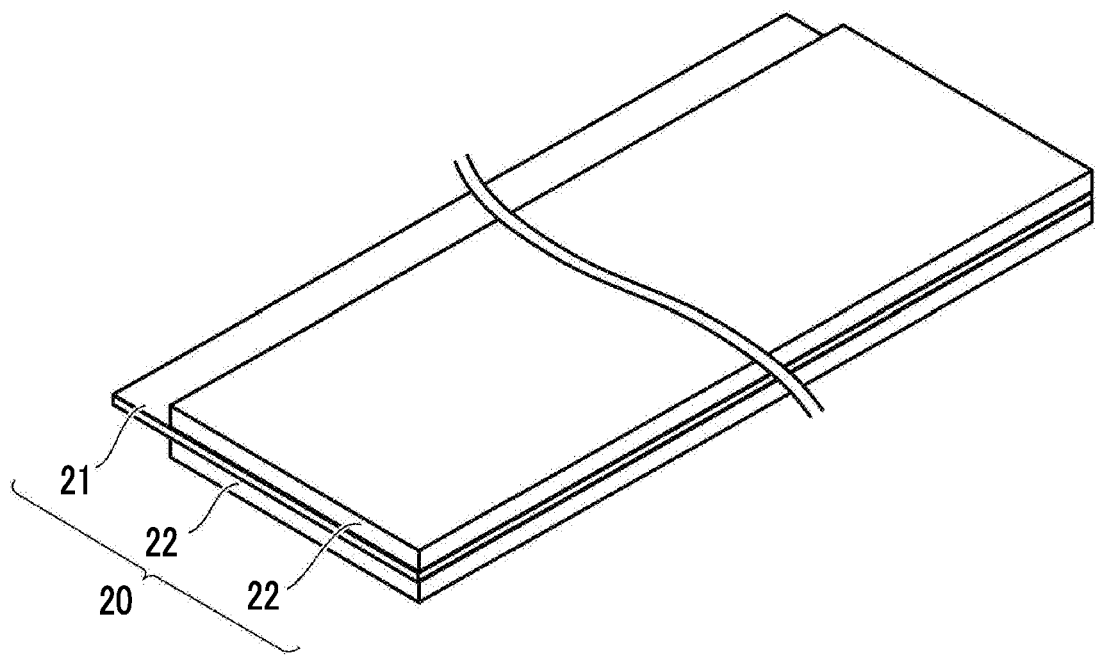
FIG. 2 is a schematic diagram showing an example of a configuration of a negative electrode of the present embodiment.

The negative electrode of the present embodiment contains at least graphite and silicon oxide. FIG. 2 is a schematic diagram showing an example of a configuration of the negative electrode of the present embodiment. A negative electrode 20 is a sheet. The negative electrode 20 has a belt-like planar shape. The negative electrode 20 includes a negative electrode current collector 21 and a negative electrode active material layer 22. The negative electrode active material layer 22 is formed on surfaces (both front and rear surfaces) of the negative electrode current collector 21. The negative electrode 20 may have a region in which no negative electrode active material layer 22 is formed, for example, at an end in the width direction (direction orthogonal to the longitudinal direction). This region can be used for connection with an external terminal.

The negative electrode current collector 21 may be, for example, a copper (Cu) foil. The Cu foil may be a pure Cu foil or a Cu alloy foil. The negative electrode current collector 21 may have, for example, a thickness of 5 μm to 30 μm.

In this specification, the "thickness" of components can be measured by, for example, a micrometer. The thickness of components may be measured in a cross-sectional microscope image. The microscope may be an optical microscope or an electron microscope. The thickness can be measured at at least three parts. An arithmetic mean of thicknesses of at least three parts can be used as a measurement result.

The negative electrode active material layer 22 may have, for example, a thickness of 10 μm to 200 μm, or a thickness of 50 μm to 150 μm. The negative electrode active material layer 22 may have, for example, a density of 0.5 g/cm$^3$ to 2.5 g/cm$^3$, a density of 1 g/cm$^3$ to 2 g/cm$^3$, or a density of 1 g/cm$^3$ to 1.5 g/cm$^3$. The negative electrode active material layer 22 contains graphite and silicon oxide as a negative electrode active material. That is, the negative electrode 20 contains at least graphite and silicon oxide. The negative electrode active material layer 22 includes, for example, 80 mass % to 99.5 mass % of the negative electrode active material, and 0 mass % to 15 mass % of a conductive material with the remainder being made up of a binder.

The graphite may be natural graphite or artificial graphite. The shape of graphite is not particularly limited. The graphite may have, for example, a clumped shape, a spherical shape, or a scaly shape. The surface of graphite may be covered with, for example, amorphous carbon. The graphite may have, for example, an average particle size of 1 μm to 30 μm, or an average particle size of 15 μm to 20 μm. The "average particle size" in this specification refers to a particle size at which a cumulative volume is 50% of the total volume from the side of fine particles in a volume-based particle size distribution measured by a laser diffraction scattering method.

"Silicon oxide" of the present embodiment may have any atomic ratio known in the related art. Silicon oxide may have, for example, a chemical composition represented by the following formula (I): $SiO_x$ (here, in the formula, x satisfies 0.1≤x<2) . . . (I).

The chemical composition of silicon oxide may be measured by, for example, glow discharge mass spectrometry (GDMS), or inductively coupled plasma emission spectrometry (ICP-AES). The chemical composition can be measured at least three times. An arithmetic mean of at least three measurements can be used as a measurement result. In the above formula (I), x may satisfy, for example, 0.5≤x≤1.5, or 1.0≤x≤1.5.

The silicon oxide may have, for example, an average particle size of 1 μm to 30 μm. The silicon oxide may have, for example, a smaller average particle size than graphite. The silicon oxide may have, for example, an average particle size of 5 μm to 15 μm.

The silicon oxide may have, for example, a proportion of 3 mass % or more and 7 mass % or less with respect to the total amount of the graphite and the silicon oxide. Thus, for example, a balance between a capacity and durability is expected to be improved. The silicon oxide may have, for example, a proportion of 3 mass % or more and 5 mass % or less or a proportion of 5 mass % or more and 7 mass % or less with respect to the total amount of the graphite and the silicon oxide. In this specification, when the mass ratio has a value after the decimal point, it is rounded to the nearest integer.

The negative electrode 20 may contain other negative electrode active materials as long as it contains graphite and silicon oxide. Other negative electrode active materials include, for example, easily graphitizable carbon, non-graphitizable carbon, silicon, tin, tin oxide, and lithium titanate. The total amount of the graphite and the silicon oxide may be, for example, a proportion of 50 mass % or more and 100 mass % or less, a proportion of 75 mass % or more and 100 mass % or less, a proportion of 90 mass % or more and 100 mass % or less, or a proportion of 95 mass % or more and 100 mass % or less with respect to all of the negative electrode active materials.

The conductive material is not particularly limited. The conductive material may be, for example, acetylene black, thermal black, furnace black, or vapor grown carbon fibers. One type of conductive material may be used alone, or two or more types of conductive material may be used in combination. Here, when graphite has a proportion of 93 mass % or more and 97 mass % or less with respect to the total amount of the graphite and the silicon oxide, the conductive material may not be used. This is because graphite has high electron conductivity.

The binder is not particularly limited. The binder may be, for example, carboxymethyl cellulose (CMC), styrene butadiene rubber (SBR), polyacrylic acid (PAA), or an ethylene-acrylic acid ester copolymer. One type of binder may be used alone or two or more types of binder may be used in combination.

A method of producing a negative electrode is not particularly limited. The negative electrode can be produced by a method known in the related art. For example, the negative electrode active material (graphite and silicon oxide), the conductive material, the binder, and a solvent may be mixed together to prepare a negative electrode paste. The solvent may be appropriately selected according to the type of binder. For example, when the binder is CMC and SBR, water may be used as the solvent. A general stirrer (for example, a planetary mixer) may be used for a mixing operation.

The negative electrode paste is applied to the surface of the negative electrode current collector 21 and dried. Thus, the negative electrode active material layer 22 may be formed. A general coating device (for example, a die coater) may be used for a coating operation. The negative electrode active material layer 22 is compressed so that the negative electrode active material layer 22 has a predetermined thickness. For example, a rolling mill may be used for a compression operation. Thereby, the negative electrode 20 may be produced.

Positive Electrode

Figure 3:
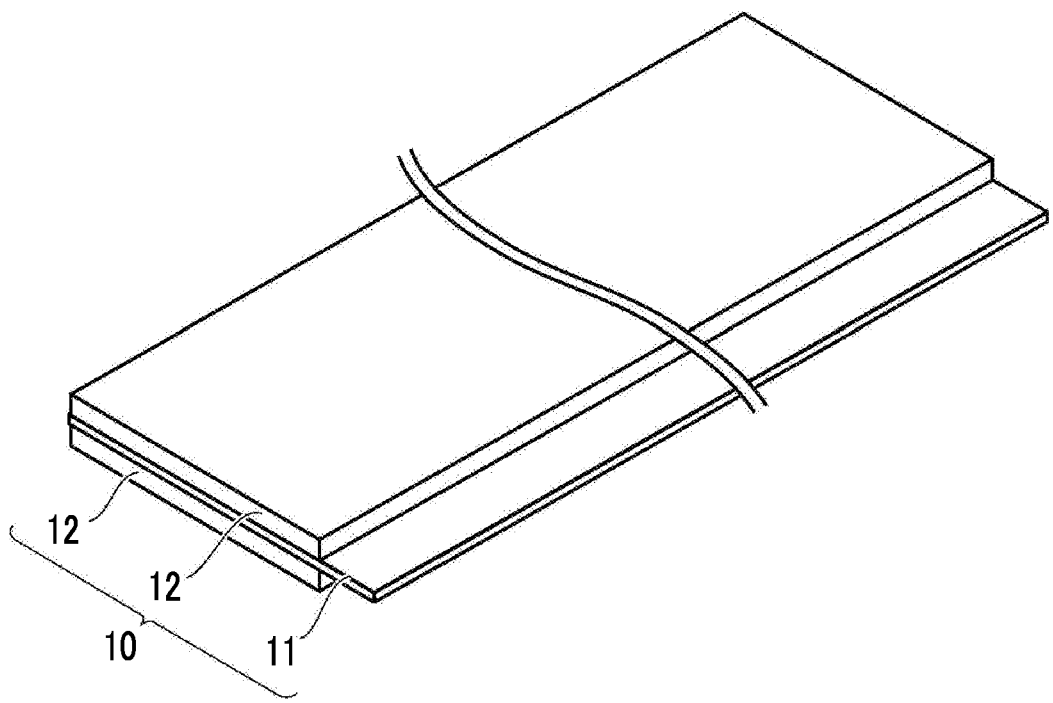
FIG. 3 is a schematic diagram showing an example of a configuration of a positive electrode of the present embodiment.

The positive electrode of the present embodiment contains at least a positive electrode active material. FIG. 3 is a schematic diagram showing an example of a configuration of the positive electrode of the present embodiment. A positive electrode 10 is a sheet. The positive electrode 10 has a belt-like planar shape. The positive electrode 10 includes a positive electrode current collector 11 and a positive electrode active material layer 12. The positive electrode active material layer 12 is formed on surfaces (both front and rear surfaces) of the positive electrode current collector 11. The positive electrode 10 may have a region in which no positive electrode active material layer 12 is formed, for example, at an end in the width direction. This region can be used for connection with an external terminal.

The positive electrode current collector 11 may be, for example, an aluminum (Al) foil. The Al foil may be a pure Al foil or an Al alloy foil. The positive electrode current collector 11 may have, for example, a thickness of 10 μm to 30 μm.

The positive electrode active material layer 12 may have, for example, a thickness of 10 μm to 200 μm or a thickness of 50 μm to 150 μm. The positive electrode active material layer 12 may have, for example, a density of 2 g/cm$^3$ to 4 g/cm$^3$ or a density of 2.5 g/cm$^3$ to 3.5 g/cm$^3$. The positive electrode active material layer 12 contains a positive electrode active material. That is, the positive electrode 10 contains at least a positive electrode active material. The positive electrode active material layer 12 may include, for example, 80 mass % to 98 mass % of the positive electrode active material and 1 mass % to 15 mass % of the conductive material with the remainder being made up of the binder.

The positive electrode active material is not particularly limited. The positive electrode active material may be, for example, $LiCoO_2$, $LiNiO_2$, $LiMnO_2$, $LiNi_aCo_bM_cO_2$ (here, in the formula, M is at least one of Mn and Al, and a, b, and c satisfy 0<a<1, 0<b<1, 0<c<1, a+b+c=1), $LiMn_2O_4$, $LiFePO_4$, or the like. As a positive electrode active material represented by the general formula: $LiNi_aCo_bMn_cO_2$, for example, $LiNi_{1/3}Co_{1/3}Mn_{1/3}O_2$, and $LiNi_{0.82}Co_{0.15}Al_{0.03}O_2$ may be exemplified. One type of positive electrode active material may be used alone or two or more types of positive electrode active material may be used in combination. The positive electrode active material may have, for example, an average particle size of 1 μm to 30 μm.

The conductive material is not particularly limited. The conductive material may be, for example, acetylene black, thermal black, furnace black, graphite, or vapor grown carbon fibers. One type of conductive material may be used alone or two or more types of conductive material may be used in combination.

The binder is not particularly limited. The binder may be, for example, polyvinylidene fluoride (PVdF), a vinylidene fluoride-hexafluoropropylene copolymer (PVdF-HFP), polytetrafluoroethylene (PTFE), or PAA. One type of binder may be used alone or two or more types of binder may be used in combination.

A method of producing a positive electrode is not particularly limited. The positive electrode can be produced by a method known in the related art. For example, the positive electrode active material, the conductive material, the binder, and a solvent may be mixed together to prepare a positive electrode paste. The solvent may be appropriately changed according to the type of binder. For example, when the binder is PVdF, N-methyl-2-pyrrolidone (NMP) may be used as the solvent. A general stirrer may be used for a mixing operation.

The positive electrode paste is applied to the surface of the positive electrode current collector 11 and dried. Thus, the positive electrode active material layer 12 may be formed. A general coating device may be used for a coating operation. The positive electrode active material layer 12 is compressed so that the positive electrode active material layer 12 has a predetermined thickness. For example, a rolling mill may be used for a compression operation. Thereby, the positive electrode 10 may be produced.

Electrode Group

Figure 4:
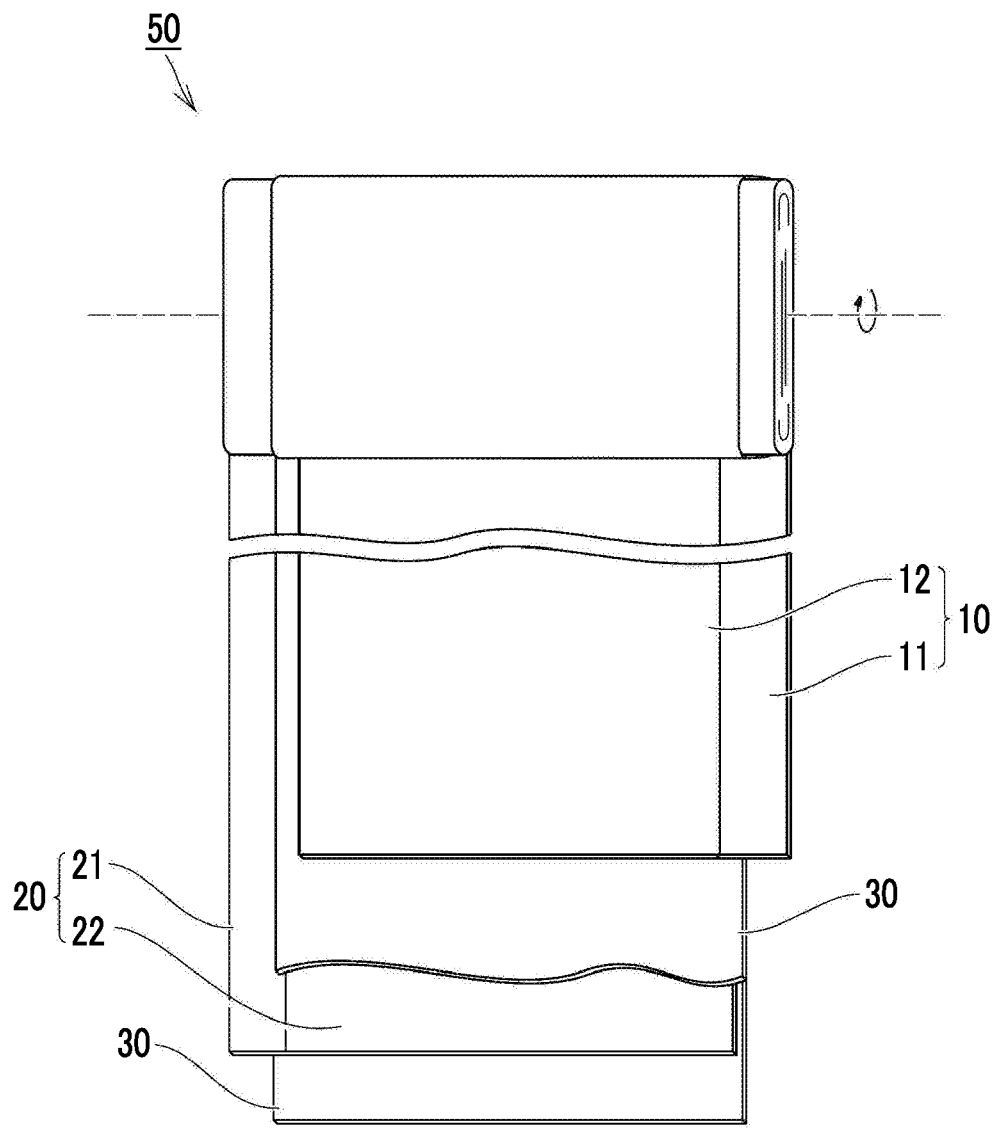
FIG. 4 is a schematic diagram showing an example of a configuration of an electrode group of the present embodiment.

The electrode group of the present embodiment includes at least a positive electrode and a negative electrode. FIG. 4 is a schematic diagram showing an example of a configuration of the electrode group of the present embodiment. An electrode group 50 is of a winding type. That is, the electrode group 50 may be produced by laminating the positive electrode 10, a separator 30, the negative electrode 20 and a separator 30 in that order and additionally winding them in a spiral shape. That is, the electrode group 50 includes at least the positive electrode 10 and the negative electrode 20. The electrode group 50 may further include the separator 30. The electrode group 50 may be formed into a flat shape after winding. For example, a flat press machine may be used for forming processing.

The electrode group of the present embodiment may be of a laminate type. That is, the electrode group may be produced by alternately laminating a plurality of positive electrodes and negative electrodes so that the positive electrodes and the negative electrodes face each other with the separators therebetween. When the electrode group is of a laminate type, the positive electrode, the negative electrode, and the separator may have, for example, a rectangular planar shape.

The separator 30 is a porous sheet. The separator 30 has a belt-like planar shape. The separator 30 has an electrically insulating property. The separator 30 may have, for example, a thickness of 10 μm to 30 μm. The separator 30 may be made of, for example, polyethylene (PE) or polypropylene (PP).

The separator 30 may have a multi-layer structure. For example, the separator 30 may be formed by laminating a polypropylene layer, a polyethylene layer and a polypropylene layer in that order. The surface of the separator 30 may include a heat resistant layer. The heat resistant layer may have, for example, a thickness of 1 μm to 10 μm. The heat resistant layer contains a heat resistant material. The heat resistant material may be, for example, an oxide material such as alumina, or a resin material such as polyimide and aramid.

Case

Figure 5:
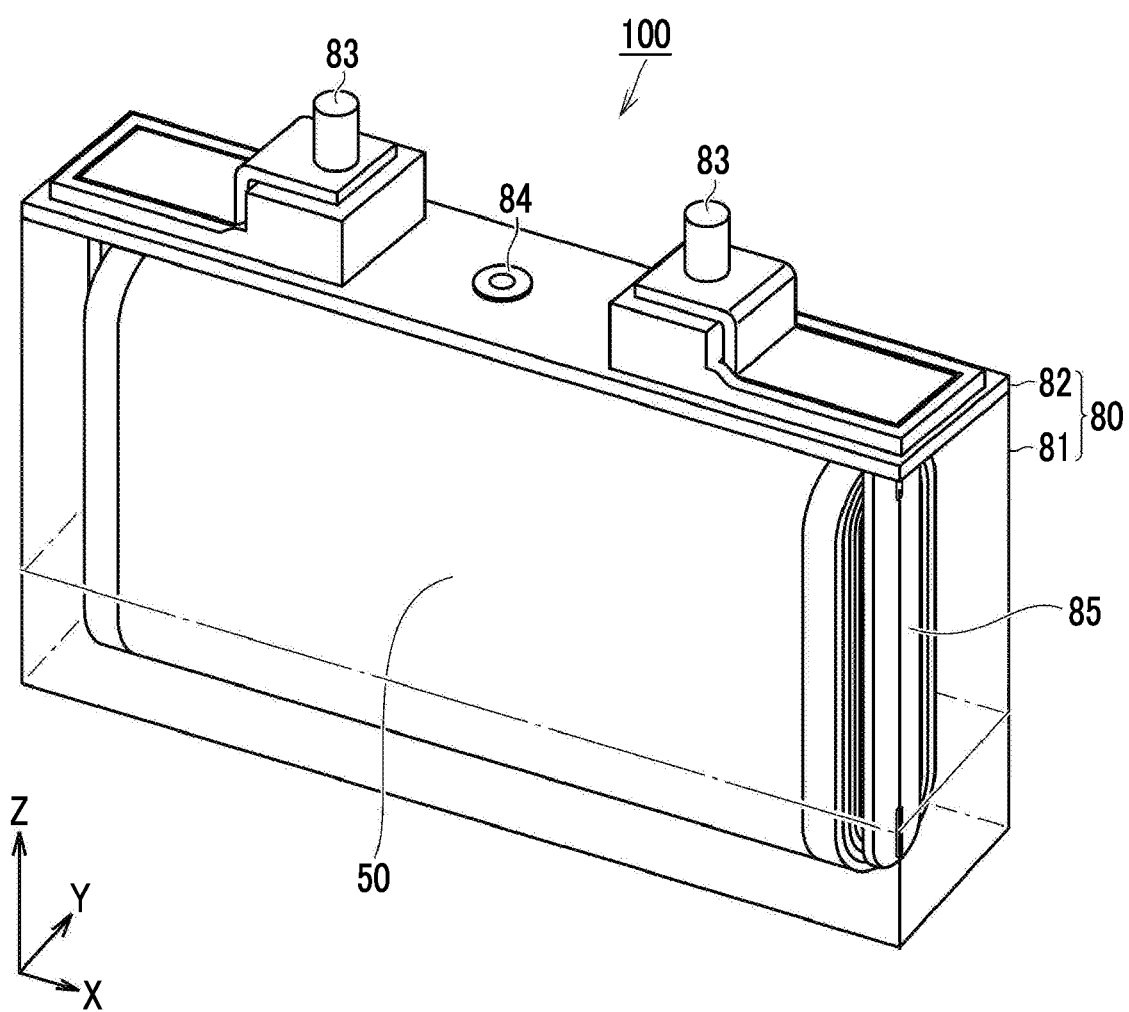
FIG. 5 is a schematic diagram showing an example of a configuration of a lithium ion secondary battery of the present embodiment.

In the present embodiment, a case in which the electrode group including at least a positive electrode and a negative electrode is accommodated is prepared. FIG. 5 is a schematic diagram showing an example of a configuration of a lithium ion secondary battery of the present embodiment. In the present embodiment, a predetermined case 80 is prepared. The case 80 is a container in which the electrode group 50 and an electrolyte solution are accommodated. The case 80 may include a can 81 having an opening and a lid 82 closing the opening. The case 80 can be hermetically sealed.

The case 80 may be made of a metal material or a resin material. The case 80 has a rectangular shape (flat parallelepiped shape). However, the case of the present embodiment may have, for example, a cylindrical shape. The case of the present embodiment may be, for example, a bag made of an aluminum laminate film.

The lid 82 includes an external terminal 83 and an injection hole 84. The injection hole 84 can be opened or closed. The case 80 may include a current interrupt device (CID), a gas exhaust valve, and the like. The electrode group 50 is accommodated in the case 80. The electrode group 50 is electrically connected to a current collector plate 85. The current collector plate 85 is electrically connected to the external terminal 83. That is, the electrode group 50 is electrically connected to the external terminal 83. Thereby, the case 80 in which the electrode group 50 including at least the positive electrode 10 and the negative electrode 20 is accommodated may be prepared.

(B) Injecting First Electrolyte Solution

The production method of the present embodiment includes injecting a first electrolyte solution containing an additive into the case so that the first electrolyte solution is impregnated into the electrode group. The first electrolyte solution does not contain FEC.

For example, the first electrolyte solution is injected from the injection hole 84 into the case 80. The injected first electrolyte solution is impregnated into the electrode group 50. In order to prevent water from entering, an injection operation may be performed in a low dew point environment. After the first electrolyte solution is injected, the injection hole 84 is closed temporarily. The one-dot dashed line in FIG. 5 indicates a liquid level of the first electrolyte solution (or a second electrolyte solution to be described below).

First Electrolyte Solution

The first electrolyte solution contains a solvent, a lithium (Li) salt and an additive. The Li salt and the additive are dissolved in the solvent. The solvent is aprotic. The solvent may be, for example, a solvent in which a cyclic carbonate and a chain carbonate are mixed. The mixing ratio may be, for example, "cyclic carbonate:chain carbonate=about 1:9 to 5:5" by volume ratio.

Examples of the cyclic carbonate include ethylene carbonate (EC), propylene carbonate (PC), and butylene carbonate (BC). Examples of the chain carbonate include ethyl methyl carbonate (EMC), dimethyl carbonate (DMC), and diethyl carbonate (DEC). One type of each of the cyclic carbonate and the chain carbonate may be used alone or two or more types thereof may be used in combination.

The solvent may contain, for example, a lactone, a cyclic ether, a chain ether, and a carboxylic ester. As the lactone, for example, γ-butyrolactone (GBL), and δ-valerolactone may be exemplified. As the cyclic ether, for example, tetrahydrofuran (THF), 1,3-dioxolane, and 1,4-dioxane may be exemplified. As the chain ether, 1,2-dimethoxyethane (DME) and the like may be exemplified. As the carboxylic ester, for example, methyl formate (MF), methyl acetate (MA), and methyl propionate (MP) may be exemplified.

The Li salt functions as a supporting electrolyte. The Li salt may have, for example, a proportion of 0.5 mol % or more and 2.0 mol % or less or a proportion of 0.8 mol % or more and 1.2 mol % or less, with respect to the first electrolyte solution. The Li salt may be, for example, $LiPF_6$, $LiBF_4$, $Li[N(FSO_2)_2]$, $Li[N(CF_3SO_2)_2]$, $LiPO_2F_2$, or $Li[B(C_2O_4)_2]$. One type of Li salt may be used alone or two or more types of Li salt may be used in combination.

The additive is reduced and decomposed mainly on the surface of graphite during the first charging to be described below and may form an SEI on the surface of graphite. The additive may have, for example, a proportion of 0.5 mass % or more and 3 mass % or less or a proportion of 1 mass % or more and 3 mass % or less with respect to the first electrolyte solution. When two or more types of additives are used, the additives (the total amount) may have, for example, a proportion of 0.5 mass % or more and 3 mass % or less or a proportion of 1 mass % or more and 3 mass % or less, with respect to the first electrolyte solution.

The additive has a reductive decomposition potential of 0.5 V (vs. $Li^+/Li$) or more and 1.5 V (vs. $Li^+/Li$) or less. The reductive decomposition potential of the additive can be measured by cyclic voltammetry (CV). The "reductive decomposition potential" in this specification indicates a higher potential (that is, a potential at which reductive decomposition starts when the potential is swept from a high potential to a low potential) between both end potentials of a reduction current peak in the cyclic voltammogram.

One type of additive may be used alone or two or more types of additive may be used in combination. The additive may be, for example, at least one selected from the group consisting of VC (1.5 V (vs. $Li^+/Li$)), PS (1.5 V (vs. $Li^+/Li$)) and ES (1.2 V (vs. $Li^+/Li$)). Here, the value in the parentheses indicates a reductive decomposition potential.

The first electrolyte solution (and a second electrolyte solution to be described below) may contain various additives in addition to the additive that can form an SEI. The first electrolyte solution may contain, for example, a gas generating agent. As the gas generating agent, for example, cyclohexylbenzene (CHB), and biphenyl (BP) may be exemplified.

(C) First Charging (Forming SEI Derived from Additive)

The production method of the present embodiment includes charging the electrode group into which the first electrolyte solution is impregnated so that the potential of the negative electrode is lowered to a first potential. The first potential is higher than 0.2 V (vs. $Li^+/Li$) and is equal to or lower than the reductive decomposition potential of the additive. In the first charging, an SEI derived from the additive may be formed mainly on the surface of graphite.

A predetermined charging and discharging device is prepared. The external terminal 83 is connected to the charging and discharging device. Thus, the electrode group 50 is connected to the charging and discharging device. A current is supplied from the charging and discharging device to the electrode group 50. That is, the electrode group 50 is charged. The first charging may be performed, for example in a temperature environment of 10° C. to 30° C.

Figure 6:
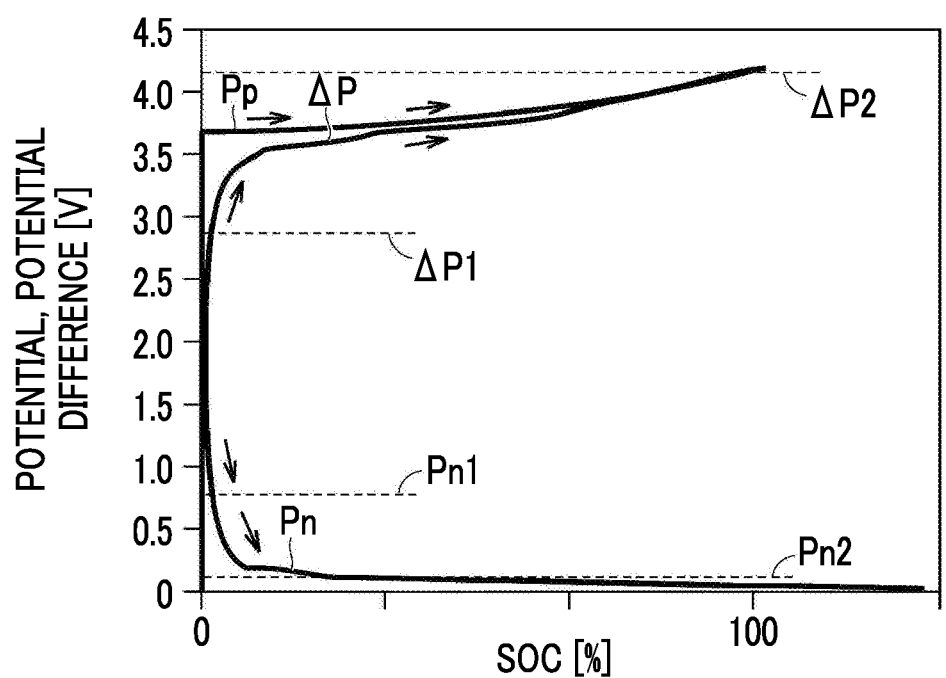
FIG. 6 is a graph showing an example of a charging profile.

FIG. 6 is a graph showing an example of a charging profile. In the graph, the vertical axis represents a potential of the positive electrode 10, a potential of the negative electrode 20, or a potential difference between the positive electrode 10 and the negative electrode 20 (hereinafter referred to as a "potential difference between positive and negative electrodes"). In the graph, the horizontal axis represents a charging rate (state of charge, SOC) of a battery 100. The negative electrode 20 of the present embodiment has a larger charging capacity per unit area than the positive electrode 10. Thus, when a single negative electrode 20 is charged, the negative electrode 20 can be charged to a region in which the SOC exceeds 100%.

During charging, a potential difference (ΔP) between positive and negative electrodes is monitored by the charging and discharging device. A potential (Pn) of the negative electrode 20 can be measured as a potential difference between the negative electrode 20 and Li metal. According to charging, a potential (Pp) of the positive electrode 10 increases. A potential (Pn) of the negative electrode 20 decreases. A potential difference (ΔP=Pp−Pn) between positive and negative electrodes increases. The first charging is performed so that the potential (Pn) of the negative electrode 20 is lowered to the first potential (Pn1).

The first potential (Pn1) is higher than 0.2 V (vs. $Li^+/Li$) and is equal to or lower than the reductive decomposition potential of the additive (such as VC described above). In a region from when charging starts until the first potential (Pn1) is reached, Li ions can be inserted mainly into graphite. In a region of 0.2 V (vs. $Li^+/Li$) or less, Li ions can be inserted mainly into silicon oxide. Thus, during the first charging, Li ions can be inserted mainly into graphite. That is, an SEI derived from the additive may be formed on the surface of graphite.

During the first charging, a part of the additive may be reduced and decomposed or the entire additive may be reduced and decomposed as long as an SEI derived from the additive is formed. That is, during the first charging, at least a part of the additive can be reduced and decomposed.

The first potential (Pn1) may be 0.5 V (vs. $Li^+/Li$) or more. Thus, during the first charging, it is possible to prevent an SEI derived from the additive (other than FEC) from being formed on the surface of silicon oxide. As a result, during the second charging to be described below, more SEI derived from FEC is expected to be formed on the surface of silicon oxide. When the first potential (Pn1) is 0.5 V (vs. $Li^+/Li$) or more, a potential difference between positive and negative electrodes may be, for example, a first potential difference (ΔP1) of 0 V or more and 3.1 V or less.

A charging type of the first charging may be constant current type charging (CC charging), constant voltage type charging (CV charging), or constant current and constant voltage type charging (CCCV charging).

A current rate for the first charging may be, for example, 0.05 C to 1.0 C, 0.1 C to 0.5 C, or 0.1 C to 0.3 C. In this specification, "1 C" indicates a current rate at which a rated capacity of a battery is discharged in one hour. For example, when the rated capacity of the battery is 25 Ah, 1 C is 25 A, and 0.1 C is 2.5 A.

In order to improve uniformity of the SEI derived from the additive, the first charging may be CCCV charging. That is, the production method of the present embodiment may further include charging for a predetermined period after the potential of the negative electrode 20 is lowered to the first potential (Pn1) and before FEC is injected into the case 80 so that the negative electrode 20 maintains the first potential (Pn1).

More specifically, CC charging is performed until the potential of the negative electrode 20 reaches the first potential (Pn1). After the potential of the negative electrode 20 reaches the first potential (Pn1), the charging type is switched from CC charging to CV charging. Further, CV charging is performed for a predetermined period so that the first potential (Pn1) is maintained. The predetermined period here indicates a CV charging time. The CV charging time may be, for example, 10 minutes or longer and 5 hours or shorter, 30 minutes or longer and 3 hours or shorter, or 1 hour or longer and 2 hours or shorter.

(D) Injecting FEC (Preparing Second Electrolyte Solution)

The production method of the present embodiment includes preparing a second electrolyte solution containing FEC in the case by injecting FEC into the case after the potential of the negative electrode is lowered to the first potential.

After the potential of the negative electrode 20 is lowered to the first potential (Pn1), the injection hole 84 of the case 80 is opened. A predetermined amount of FEC is injected from the injection hole 84 into the case 80. In the case, the first electrolyte solution subjected to the first charging and FEC are mixed together to prepare a second electrolyte solution.

The FEC may have, for example, a proportion of 1 mass % or more and 7 mass % or less, with respect to the second electrolyte solution. When a content of FEC in the second electrolyte solution is 1 mass % or more, a capacity retention rate during high temperature storage is expected to increase. When a content of FEC in the second electrolyte solution is 7 mass % or less, an amount of gas generated during high temperature storage is expected to be reduced. The FEC may have, for example, a proportion of 2 mass % or more or a proportion of 3 mass % or more, with respect to the second electrolyte solution. The FEC may have a proportion of 6 mass % or less, a proportion of 5 mass % or less, or a proportion of 4 mass % or less with respect to the second electrolyte solution.

FEC may be injected into the case 80 alone, or a mixture of FEC and another component (such as a solvent and a Li salt) may be injected into the case 80 as long as FEC is injected into the case 80. After FEC is injected, the injection hole 84 is closed again. The case may be left for a predetermined time (for example, about 30 minutes to 2 hours) after FEC is injected and until the second charging to be described below is performed so that FEC uniformly diffuses. In addition, the case 80 may be heated to, for example, about 30° C. to 40° C.

Second Electrolyte Solution

The second electrolyte solution contains FEC. The second electrolyte solution is assumed to contain a smaller amount of additives (such as VC) than the first electrolyte solution. The second electrolyte solution may have substantially the same solvent composition and Li salt concentration as the first electrolyte solution. The second electrolyte solution may have a different solvent composition and Li salt concentration from that of the first electrolyte solution. As described above, when FEC and other components are injected, a solvent composition, a Li salt concentration and the like of the second electrolyte solution can be adjusted.

Here, FEC has a reductive decomposition potential of about 1.3 V (vs. $Li^+/Li$). When FEC is injected, the negative electrode 20 already has a potential that is equal to or lower than the reductive decomposition potential of FEC. However, reductive decomposition of FEC and formation of an SEI are thought to be caused by a reaction of Li ions inserted into the negative electrode active material. Therefore, as long as the second charging to be described below is not performed, reductive decomposition of FEC and formation of SEI are thought to be unlikely to occur.

(E) Second Charging (Forming SEI Derived from FEC)

The production method of the present embodiment includes charging the electrode group after the second electrolyte solution is prepared so that the potential of the negative electrode is lowered to a second potential. The second potential is 0.2 V (vs. $Li^+/Li$) or less. In the second charging, an SEI derived from FEC may be formed mainly on the surface of silicon oxide.

The external terminal 83 is connected to the charging and discharging device again. The second charging may be performed, for example, in a temperature environment of 10° C. to 30° C. A charging type for the second charging may be CC charging, CV charging, or CCCV charging. A current rate for the second charging may be, for example, 0.05 C to 1.0 C, 0.1 C to 0.5 C, or 0.1 C to 0.3 C.

The second charging is performed until the potential of the negative electrode 20 reaches a second potential (Pn2). The second potential (Pn2) is 0.2 V (vs. $Li^+/Li$) or less. The second potential (Pn2) may be 0.1 V (vs. $Li^+/Li$) or less or 0.04 V (vs. $Li^+/Li$) or less. The second potential (Pn2) may be higher than 0 V (vs. $Li^+/Li$) or may be 0.01 V (vs. $Li^+/Li$) or more. When the second potential (Pn2) is 0.2 V (vs. $Li^+/Li$) or less, a potential difference between positive and negative electrodes may be, for example, a second potential difference (ΔP2) of 4 V or more and 4.2 V or less.

In order to improve uniformity of an SEI derived from FEC, the second charging may be CCCV charging. That is, the production method of the present embodiment may further include charging for a predetermined period after the potential of the negative electrode 20 is lowered to the second potential (Pn2) so that the negative electrode 20 maintains the second potential (Pn2).

More specifically, CC charging is performed until the potential of the negative electrode reaches the second potential (Pn2). After the potential of the negative electrode 20 reaches the second potential (Pn1), the charging type is switched from CC charging to CV charging. Further, CV charging is performed for a predetermined period so that the second potential (Pn2) is maintained. The CV charging time may be, for example, 10 minutes or longer and 5 hours or shorter, 30 minutes or longer and 3 hours or shorter, or 1 hour or longer and 2 hours or shorter.

During the second charging, a part of FEC may be reduced and decomposed or the entire FEC may be reduced and decomposed as long as an SEI derived from FEC is formed. That is, during the second charging, at least a part of FEC may be reduced and decomposed. In addition, during the second charging, the remainder of the additive (such as VC) that was added previously may also be reduced and decomposed.

After the second charging, aging of the battery 100 (being left in a predetermined temperature environment) may be performed. An aging temperature may be, for example, 20° C. to 80° C., or 40° C. to 80° C. An aging time may be, for example, 1 hour to 48 hours, 6 hours to 24 hours, or 8 hours to 12 hours. Thereby, a lithium ion secondary battery (the battery 100) of the present embodiment may be produced.

Applications and the Like

The lithium ion secondary battery of the present embodiment can have a high capacity. This is because the negative electrode 20 contains silicon oxide. The lithium ion secondary battery of the present embodiment can exhibit excellent durability. This is thought to be caused by the fact that graphite contains an SEI derived mainly from an additive and silicon oxide contains an SEI derived mainly from FEC.

As applications for which a high capacity and durability are required, power batteries for, for example, hybrid vehicles (HV), plugin hybrid vehicles (PHV), and electric vehicles (EV) may be exemplified. However, the lithium ion secondary battery of the present embodiment is not limited to such power batteries. The lithium ion secondary battery of the present embodiment can be used for any application.

Examples will be described below. However, the following examples do not limit the scope of the claims.

Example 1

(A) Preparing a Case (Negative electrode) The following materials were prepared. Negative electrode active material: graphite (average particle size: 15 μm), SiO (average particle size: 10 μm), binder: CMC and SBR, solvent: water, and negative electrode current collector: belt-like Cu foil (thickness: 10 μm)

The negative electrode active material, the binder, and the solvent were mixed together to prepare a negative electrode paste. The negative electrode paste was applied to surfaces (both front and rear surfaces) of the negative electrode current collector and dried. Thus, a negative electrode active material layer was formed. The negative electrode active material layer was compressed. Thereby, a negative electrode was produced.

In the negative electrode, the negative electrode active material layer had a density of 1.5 g/cm$^3$. The negative electrode active material layer had a composition of "negative electrode active material:CMC:SBR=98:1:1" by mass ratio. SiO had a proportion of 3 mass % with respect to the total amount of the graphite and the SiO. That is, the negative electrode contained at least graphite and silicon oxide. In the following Table 1, a proportion of SiO with respect to the total amount of the graphite and the SiO is described as an "SiO proportion."

Positive Electrode

The following materials were prepared. Positive electrode active material: LiNi$_{1/3}$Co$_{1/3}$Mn$_{1/3}$O$_2$ (average particle size: 10 μm), conductive material: acetylene black, binder: PVdF, solvent: NMP, and positive electrode current collector: belt-like Al foil (thickness: 15 μm)

The positive electrode active material, the conductive material, the binder, and the solvent were mixed together to prepare a positive electrode paste. The positive electrode paste was applied to surfaces (both front and rear surfaces) of the positive electrode current collector and dried. Thus, a positive electrode active material layer was formed. The positive electrode active material layer was compressed. Thereby, a positive electrode was produced.

In the positive electrode, the positive electrode active material layer had a density of 3 g/cm$^3$. The positive electrode active material layer had a composition of "positive electrode active material:conductive material:binder=92:5:3" by mass ratio.

A belt-like separator was prepared. The separator had a 3-layer structure. That is, the separator was formed by laminating a polypropylene layer, a polyethylene layer and a polypropylene layer in that order.

Electrode Group

The positive electrode, the separator, the negative electrode, and the separator were laminated in that order and additionally they were wound in a spiral shape. Thus, an electrode group was produced. That is, the electrode group including at least a positive electrode and a negative electrode was produced.

Case

A case was prepared. The case included a can and a lid. The lid included an external terminal and an injection hole. A current collector plate was connected to the external terminal. The electrode group was welded to the current collector plate. The electrode group was inserted into the can. The lid and the can were welded by a laser. Thereby, a case in which an electrode group including at least a positive electrode and a negative electrode was accommodated was prepared.

(B) Injecting a First Electrolyte Solution

A first electrolyte solution having the following composition was injected into the case through the injection hole. The first electrolyte solution was impregnated into the electrode group. After the first electrolyte solution was injected, the injection hole was closed.

First Electrolyte Solution

Solvent: [EC:EMC=3:7 (volume ratio)], Li salt: LiPF$_6$ (1 mol/l), and additive: VC (amount added: 2 mass %, reductive decomposition potential: 1.5 V (vs. Li$^+$/Li))

(C) First Charging (Forming SEI Derived from Additive)

After the first electrolyte solution was impregnated into the electrode group, in a 25° C. environment, the electrode group was charged according to the following CCCV charging. Thus, the potential of the negative electrode was lowered to 0.5 V (vs. Li$^+$/Li). 0.5 V (vs. Li$^+$/Li) corresponded to the first potential. The first potential was higher than 0.2 V (vs. Li$^+$/Li) and equal to or less than the reductive decomposition potential (1.5 V (vs. Li$^+$/Li)) of VC.

CCCV Charging

Current rate during CC charging=0.2 C
Potential difference (first potential difference) during CV charging=3.1 V (D) Injecting FEC (Preparing Second Electrolyte Solution)

The injection hole was opened and FEC was injected into the case. Thus, a second electrolyte solution was prepared in the case. The FEC had a proportion of 1 mass % with respect to the second electrolyte solution. After FEC was injected, the injection hole was closed.

(E) Second Charging (Forming SEI Derived from FEC)

In a 25° C. environment, the electrode group was charged according to the following CCCV charging. Thus, the potential of the negative electrode was lowered to 0.04 V (vs. Li$^+$/Li). 0.04 V (vs. Li$^+$/Li) corresponded to the second potential. The second potential was 0.2 V (vs. Li$^+$/Li) or less.

CCCV Charging

Current rate during CC charging=0.2 C
Potential difference (second potential difference) during CV charging=4.2 V
After charging, aging was performed. An aging temperature was 60° C. An aging time was 10 hours.
Thereby, a rectangular lithium ion secondary battery was produced. The battery was designed to have a rated capacity of 25 Ah in a voltage range of 2.5 V to 4.2 V.

Examples 2 and 3

Batteries were produced in the same production method as in Example 1 except that a content of FEC in the second electrolyte solution was changed as shown in the following Table 1.

Examples 4 to 6

Batteries were produced in the same production method as in Example 1 except that a SiO proportion and a content of FEC in the second electrolyte solution were changed as shown in the following Table 1.

Examples 7 and 8

Batteries were produced in the same production method as in Example 5 except that the first potential or the second potential was changed as shown in the following Table 1.

Examples 9 to 11

Batteries were produced in the same production method as in Example 1 except that a SiO proportion and a content of FEC in the second electrolyte solution were changed as shown in the following Table 1.

Examples 12 to 14

Batteries were produced in the same production method as in Examples 4 to 6 except that PS was used as the additive in place of VC as shown in the following Table 1.

Examples 15 and 16

Batteries were produced in the same production method as in Examples 7 and 8 except that PS was used as the additive in place of VC as shown in the following Table 1.

Comparative Example 1

An electrode group was produced in the same procedures as in Example 1. The electrode group was accommodated in a case. An electrolyte solution having the following composition was injected into the case. In the following Table 1, additives of the Comparative example are shown in the column of the first electrolyte solution for convenience.

Electrolyte Solution

Solvent: [EC:EMC=3:7 (volume ratio)], Li salt: LiPF$_6$ (1 mol/l), additive: VC (2 mass %), and FEC (1 mass %)
After the electrolyte solution was injected, the injection hole was closed. In a 25° C. environment, the electrode group was charged according to the following CCCV charging. Thus, the potential of the negative electrode was lowered to 0.04 V (vs. Li$^+$/Li). In the following Table 1, charging conditions of the Comparative example are shown in the column of first charging for convenience.

CCCV Charging

Current rate during CC charging=0.2 C
Potential difference during CV charging=4.2 V
After charging, aging was performed in the same conditions as in Example 1. Thereby, a battery was produced.

Comparative Examples 2 to 9

Batteries were produced in the same production method as in Comparative Example 1 except that a content of FEC in the electrolyte solution was changed as shown in the following Table 1.

Evaluation of Durability

1. Measurement of Initial Capacity
In a 25° C. environment, the battery was discharged to 2.5 V according to CC discharging (0.2 C). Next, an initial capacity (initial discharging capacity) was measured according to the following CCCV charging and CCCV discharging.
CCCV charging: current rate during CC charging=0.2 C, voltage during CV charging=4.2 V
CCCV discharging: current rate during CC discharging=0.2 C, voltage during CV charging=2.5 V
2. Durability Test
In a 25° C. environment, the battery was fully charged according to CV charging (4.2 V). The battery was disposed in a thermostatic chamber set to 60° C. In the same environment, the battery was stored for 30 days. After 30 days, the capacity after storage was measured in the same conditions as in the initial capacity. A capacity retention rate was calculated by dividing the capacity after storage by the initial capacity. The results are shown in the following Table 1. A higher capacity retention rate indicates higher durability.
After the capacity retention rate was measured, the injection hole was opened, and gas inside the battery was collected. Thus, an amount of gas generated was measured. The results are shown in the following Table 1.

TABLE 1

| | Negative electrode Negative electrode active material SiO proportion Mass % | First electrolyte solution Additive Type (amount added) In parentheses mass % | First charging Between positive and negative electrodes First potential difference (ΔP1) V | First charging Negative electrode First potential (Pn1) V (vs. Li+/Li) | Second electrolyte solution Additive Type (amount added) In parentheses mass % | Second charging Between positive and negative electrodes Second potential difference (ΔP2) V | Second charging Negative electrode Second potential (Pn2) V (vs. Li+/Li) | Durability test 4.2 V 60° C. 30 days Capacity retention rate % | Durability test 4.2 V 60° C. 30 days Amount of gas generated % |
|---|---|---|---|---|---|---|---|---|---|
| Comparative Example 1 | 3 | VC(2) + FEC(1) | 4.2 | 0.04 | — | — | — | 89.8 | 100 |
| Comparative Example 2 | 3 | VC(2) + FEC(2) | 4.2 | 0.04 | — | — | — | 91.5 | 110 |
| Comparative Example 3 | 3 | VC(2) + FEC(3) | 4.2 | 0.04 | — | — | — | 92.5 | 115 |
| Example 1 | 3 | VC(2) | 3.1 | 0.5 | FEC(1) | 4.2 | 0.04 | 92.6 | 90 |
| Example 2 | 3 | VC(2) | 3.1 | 0.5 | FEC(2) | 4.2 | 0.04 | 93.5 | 103 |
| Example 3 | 3 | VC(2) | 3.1 | 0.5 | FEC(3) | 4.2 | 0.04 | 93.6 | 104 |
| Comparative Example 4 | 5 | VC(2) + FEC(3) | 4.2 | 0.04 | — | — | — | 89.4 | 120 |
| Comparative Example 5 | 5 | VC(2) + FEC(4) | 4.2 | 0.04 | — | — | — | 91.3 | 126 |
| Comparative Example 6 | 5 | VC(2) + FEC(5) | 4.2 | 0.04 | — | — | — | 92.2 | 130 |
| Example 4 | 5 | VC(2) | 3.1 | 0.5 | FEC(3) | 4.2 | 0.04 | 92.1 | 108 |
| Example 5 | 5 | VC(2) | 3.1 | 0.5 | FEC(4) | 4.2 | 0.04 | 92.9 | 118 |
| Example 6 | 5 | VC(2) | 3.1 | 0.5 | FEC(5) | 4.2 | 0.04 | 93.1 | 119 |
| Example 7 | 5 | VC(2) | 2.0 | 1.5 | FEC(4) | 4.2 | 0.04 | 92.5 | 119 |
| Example 8 | 5 | VC(2) | 3.1 | 0.5 | FEC(4) | 3.5 | 0.2 | 92.7 | 120 |
| Comparative Example 7 | 7 | VC(2) + FEC(5) | 4.2 | 0.04 | — | — | — | 88.8 | 136 |
| Comparative Example 8 | 7 | VC(2) + FEC(6) | 4.2 | 0.04 | — | — | — | 91.1 | 142 |
| Comparative Example 9 | 7 | VC(2) + FEC(7) | 4.2 | 0.04 | — | — | — | 92.0 | 146 |
| Example 9 | 7 | VC(2) | 3.1 | 0.5 | FEC(5) | 4.2 | 0.04 | 91.8 | 123 |
| Example 10 | 7 | VC(2) | 3.1 | 0.5 | FEC(6) | 4.2 | 0.04 | 92.5 | 133 |
| Example 11 | 7 | VC(2) | 3.1 | 0.5 | FEC(7) | 4.2 | 0.04 | 92.7 | 135 |
| Example 12 | 5 | PS(2) | 3.1 | 0.5 | FEC(3) | 4.2 | 0.04 | 92.3 | 105 |
| Example 13 | 5 | PS(2) | 3.1 | 0.5 | FEC(4) | 4.2 | 0.04 | 93.3 | 116 |
| Example 14 | 5 | PS(2) | 3.1 | 0.5 | FEC(5) | 4.2 | 0.04 | 93.3 | 118 |
| Example 15 | 5 | PS(2) | 2.0 | 1.5 | FEC(4) | 4.2 | 0.04 | 92.8 | 117 |
| Example 16 | 5 | PS(2) | 3.1 | 0.5 | FEC(4) | 3.5 | 0.2 | 92.9 | 117 |

Results

In Table 1, for example, when comparing Example 1 and Comparative Example 1, comparing Example 4 and Comparative Example 4, and comparing Example 9 and Comparative Example 7, it was confirmed that the examples tended to have a stronger durability improvement effect obtained with respect to an amount of FEC added (a higher capacity retention rate) than the comparative examples.

This is thought to have been caused by the fact that, in the examples, an SEI derived from FEC was unlikely to be formed on the surface of graphite but it was likely to be formed on the surface of SiO. On the other hand, it is thought that, in the comparative examples, since an SEI of VC and FEC was formed on both graphite and SiO, there was less SEI derived from FEC formed on the surface of SiO.

When an amount of FEC added was larger, an amount of gas generated tended to increase. It was confirmed that the examples tended to generate smaller amounts of gas than the comparative examples. In the examples, it is thought that, an SEI derived from VC was formed on the surface of graphite and an SEI derived from FEC was formed on the surface of SiO. Thus, a gas generation reaction is thought to have been efficiently prevented.

As shown in the results of Examples 4 to 6, and Examples 12 to 14, when PS was used, the same results as with VC were obtained. If ES was used, it is thought that the same results would be obtained. In addition, also if two or more types among VC, PS and ES were used, it is thought that the same results would be obtained.

The above embodiments and examples are only examples in all respects and should not be considered as restrictive. The technical scope defined by the scope of the claims includes meanings equivalent to the descriptions of the claims and all modifications within the scope of the claims.

What is claimed is:

1. A method of producing a lithium ion secondary battery comprising:
    preparing a case in which an electrode group including at least a positive electrode and a negative electrode is accommodated;
    injecting a first electrolyte solution containing an additive into the case so that the first electrolyte solution is impregnated into the electrode group;
    charging the electrode group into which the first electrolyte solution is impregnated so that a potential of the negative electrode is lowered to a first potential;

preparing a second electrolyte solution containing fluoroethylene carbonate in the case by injecting fluoroethylene carbonate into the case after the potential of the negative electrode is lowered to the first potential; and charging the electrode group after the second electrolyte solution is prepared so that the potential of the negative electrode is lowered to a second potential, wherein the negative electrode contains at least graphite and silicon oxide, the first electrolyte solution does not contain fluoroethylene carbonate, the additive has a reductive decomposition potential of 0.5 V (vs. $Li^+/Li$) or more and 1.5 V (vs. $Li^+/Li$) or less, the first potential is higher than 0.2 V (vs. $Li^+/Li$) and is equal to or lower than the reductive decomposition potential of the additive, and the second potential is 0.2 V (vs. $Li^+/Li$) or less.

2. The method according to claim 1, wherein the additive is at least one selected from the group consisting of vinylene carbonate, propane sultone and ethylene sulfite.

3. The method according to claim 1, wherein the first potential is 0.5 V (vs. $Li^+/Li$) or more.

4. The method according to claim 1, wherein the fluoroethylene carbonate has a proportion of 1 mass % or more and 7 mass % or less with respect to the second electrolyte solution.

5. The method according to claim 1, wherein the silicon oxide has a proportion of 3 mass % or more and 7 mass % or less with respect to a total amount of the graphite and the silicon oxide.

* * * * *